United States Patent
Morgan

(10) Patent No.: US 6,532,678 B2
(45) Date of Patent: Mar. 18, 2003

(54) PITCH AND RAKE GAUGE FOR A PROPELLER

(75) Inventor: Scott Morgan, Greenfield, IN (US)

(73) Assignee: Precision Propeller, Inc., Indianapolis, IN (US)

( * ) Notice: Subject to any disclaimer, the term of this patent is extended or adjusted under 35 U.S.C. 154(b) by 0 days.

(21) Appl. No.: 10/056,351

(22) Filed: Jan. 24, 2002

(65) Prior Publication Data

US 2002/0095807 A1 Jul. 25, 2002

Related U.S. Application Data

(60) Provisional application No. 60/264,103, filed on Jan. 25, 2001.

(51) Int. Cl.[7] .............................................. G01B 5/00
(52) U.S. Cl. .................................. 33/530; 33/549
(58) Field of Search .......................... 33/530, 531, 532, 33/549, 551, 553, 554, 555

(56) References Cited

U.S. PATENT DOCUMENTS

| 1,597,357 | A | * | 8/1926 | Godfrey | ...................... 33/530 |
|---|---|---|---|---|---|
| 2,096,752 | A | | 10/1937 | Metcalf | |
| 2,248,973 | A | | 7/1941 | Eby | |
| 2,717,453 | A | * | 9/1955 | Wildt | ........................... 33/530 |
| 2,941,301 | A | * | 6/1960 | Wright | ........................ 33/572 |
| 3,380,170 | A | * | 4/1968 | Read | ............................ 33/530 |
| 4,411,073 | A | | 10/1983 | Ryan | |
| 4,642,901 | A | * | 2/1987 | Webb | ............................ 33/530 |

FOREIGN PATENT DOCUMENTS

| DE | 844 215 | 5/1952 |
|---|---|---|
| DE | 866 386 | 12/1952 |

* cited by examiner

*Primary Examiner*—Christopher W. Fulton
*Assistant Examiner*—Amy Cohen
(74) *Attorney, Agent, or Firm*—Barnes & Thornburg

(57) ABSTRACT

An apparatus and method involves the use of a gauge to measure the pitch and rake of a blade on a propeller. The gauge has a rotational sensor that determines relative rotation of a measurer. The measurer includes a pitch sensor and a rake sensor. The rotational sensor communicates with a display, which provides an output representative of pitch or rake of the blade based on signals received from the rotational sensor.

20 Claims, 10 Drawing Sheets

_US 6,532,678 B2_

PITCH AND RAKE GAUGE FOR A PROPELLER

RELATED APPLICATION

The present application claims the benefit of United States Provisional Patent Application Serial No. 60/264,103, filed Jan. 25, 2001, the complete disclosure of which is hereby expressly incorporated by reference.

BACKGROUND

The present invention relates to propellers, and particularly to a device for measuring the pitch and rake of a propeller. More particularly, the present invention relates to a pitch and rake gauge capable of pivotable movement about an axis, the pivotable movement being measured with digital accuracy.

In the disciplines of manufacturing and repairing propellers used in boats, planes, and the like, it is desirable to determine with some degree of accuracy the pitch and rake at numerous points on the propeller blades. As used herein, "pitch" relates to the theoretical distance a propeller would advance longitudinally (due to the slope of the blade) in one revolution of the propeller. "Rake," as used herein, relates to the inclination of the blade surface from the perpendicular.

SUMMARY

According to the disclosure, a pitch and rake gauge measures the pitch and rake of a blade on a propeller. The gauge comprises a propeller mount configured to support a propeller thereon. A measurer is coupled to the propeller mount and adapted to engage the blade in a stationary position. A rotational sensor gauges rotational movement of the measurer and provides signals representative of the gauged rotational movement. A display receives the signals and provides an output based on the signals.

In the disclosed embodiment, the rotational sensor is coupled to the propeller mount and is adapted to move between a pitch-sensing mode and a rake-sensing mode. The rotational sensor is illustratively an optical encoder. The rake sensor includes a straight-edge configured to extend along a radial line relative to the blade of the propeller. The pitch sensor includes two feet in spaced-apart relation, the two feet being configured to contact the propeller blade at two points substantially equally distant from the axis of the propeller.

The gauge illustratively includes an arm extending radially outwardly from the propeller mount, and a support member attached to the arm. The pitch and rake sensors are rotatably mounted upon the support member.

The disclosure also contemplates a method of measuring a characteristic of a blade on a propeller having an axis. The method includes the steps of positioning the propeller on a propeller mount, connecting a measurer to the propeller mount, assigning a neutral position for the measurer from which rotational measurements will be based, and moving the measurer into contact with a selected position on the propeller blade while rotating the measurer as necessary. The rotation of the measurer relative to the neutral position is then determined, and an electronic indication of the rotation of the measurer relative to the neutral position is provided.

According to the disclosure, the neutral position-assigning step includes zeroing the measurer by placing it in contact with a calibrating platen. A pivot member carries the rake sensor and the pitch sensor, the pivot member presenting one of either the rake sensor and pitch sensor to the propeller blade in order to determine either the rake or the pitch of the blade.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
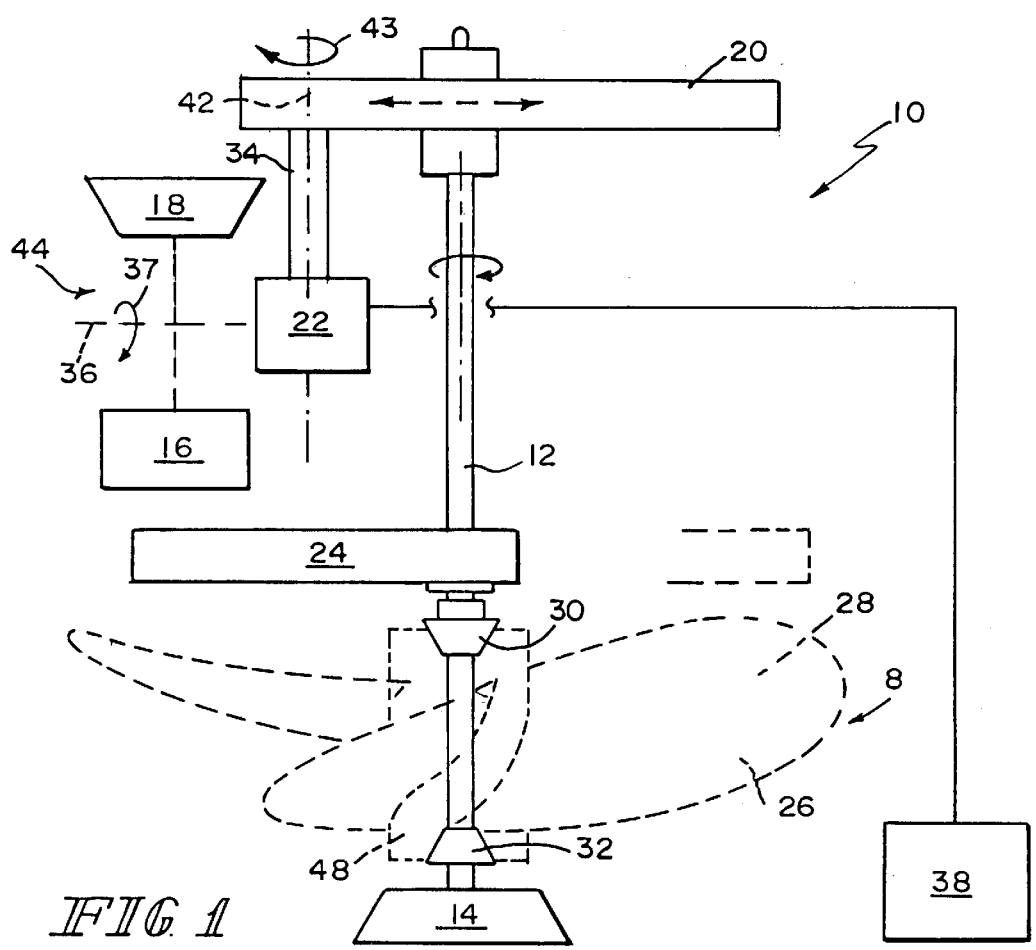
FIG. 1 is a front diagrammatic view of a pitch and rake gauge for a propeller, showing the propeller positioned on a propeller mount and a radial position arm coupled with the propeller mount and suspended above the propeller, the radial position arm supporting a support member with a pitch sensor, a rake sensor, and a rotational sensor in communication with the pitch sensor and the rake sensor, the radial position arm and support member cooperating to position the pitch sensor, the rake sensor, and the rotational sensor above a calibrating platen prior to measurement of the pitch or rake of the propeller.

A gauge 10, as diagrammatically shown in FIGS. 1–11 and shown in an illustrative embodiment in FIGS. 14–18, is configured to support a pitch sensor 16 and a rake sensor 18 above a propeller 8 for determination of the pitch and rake of a blade 26 of propeller 8. Pitch sensor 16 is diagrammatically shown in FIG. 2 positioned for measuring the pitch of propeller blade 26. As pitch sensor 16 rotates to engage the surface 28 of propeller blade 26, rotational sensor (illustratively an optical encoder) 22 senses the magnitude of rotation of pitch sensor 16 from a zeroed position. Similarly, as shown in diagrammatic view in FIG. 3, rake sensor 18 is configured to be extended substantially radially across surface 28 of propeller blade 26 and any rotation from zero of rake sensor 18 is measured with rotational sensor 22.

Gauge 10 illustratively includes a propeller mount comprising a post 12 and a base 14 for supporting the propeller 8 for pitch and rake measurement, as shown in FIG. 1. The post 12 serves as an axis-defining member as will be described hereinafter. Propeller 8 is positioned on post 12 with the cooperation of upper centering cone 30 and lower centering cone 32, the propeller 8 being capable of rotational movement about an axis that is coaxial with post 12. Gauge 10 further comprises a radial position arm 20 extending substantially perpendicularly from post 12, the radial position arm 20 carrying rotational sensor 22, rake sensor 18, and pitch sensor 16. In one embodiment, rotational sensor 22 is mounted to a support member 34, support member 34 being supported by radial position arm 20 for rotational movement as indicated by arrow 43 relative to radial position arm 20 about an axis 42 passing through radial position arm 20.

Rake sensor 18 and pitch sensor 16 combine to form a rotating assembly, referred to as measurer 44 herein. Measurer 44 is positioned to be rotated about an axis 36 passing through rotational sensor 22, the rotation being indicated by arrow 37 in FIGS. 1, 5–7, and 9–11. When measurer 44 is moved about axis 36, rotational sensor 22 senses the relative movement of measurer 44, and signals the relative movement to output device 38.

Figure 2:
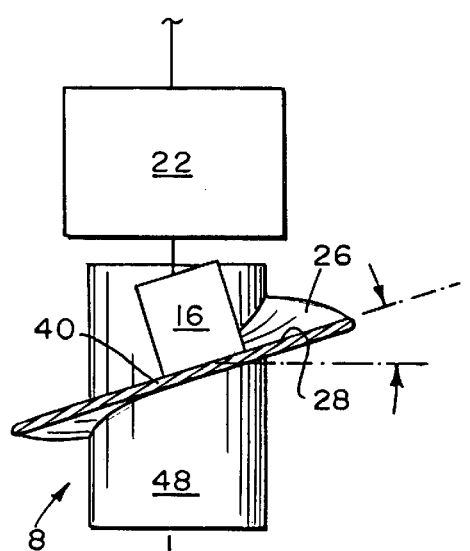
FIG. 2 is a side diagrammatic view of the gauge of FIG. 1 showing the pitch sensor coupled to the rotational sensor and pivoted for contact with a face of a propeller blade, the rotational sensor responding to pivoting of the pitch sensor by the transmission of signals to the output device of FIG. 1.

Operation of pitch sensor 16 can be seen in diagrammatic representation in FIG. 2, wherein pitch sensor 16 rotates about rotational sensor 22 such that a surface 40 on pitch sensor 16 engages surface 28 of propeller blade 26. The rotation of pitch sensor 16 about axis 36 relative to a predetermined zero value is indicative of the pitch associated with a particular propeller 8. This relative rotation is then signaled to output device 38. As noted above, the pitch of a propeller is defined as the degree of slope of a surface 28 of propeller blade 26. Pitch is typically expressed as the theoretical distance a propeller would advance longitudinally in one revolution.

Figure 3:
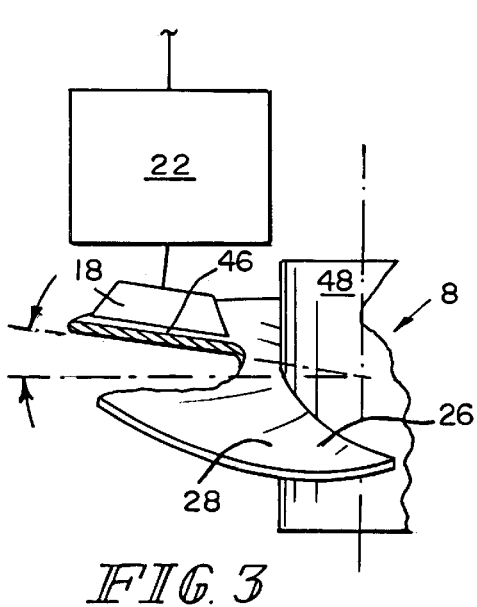
FIG. 3 is a diagrammatic view of the gauge similar to that of FIG. 2, showing instead the rake sensor viewed from the front and positioned to contact the face of the propeller blade, the rotational sensor responding to relative pivoting of the rake sensor with signals to the output device of FIG. 1.

The similar operation of rake sensor 18 can be seen in FIG. 3, wherein a contact surface 46 of rake sensor 18 engages surface 28 of propeller blade 26, thereby measuring the rake of propeller blade 26 along a radial line. Rotational sensor 22 senses the rotation of rake sensor 18 relative to a predetermined zero value, and signals the relative movement to output device 38. As noted above, the rake of a propeller is defined as the inclination of the propeller blade 26 relative to a line extending radially and perpendicularly from the hub 48.

Figure 4:
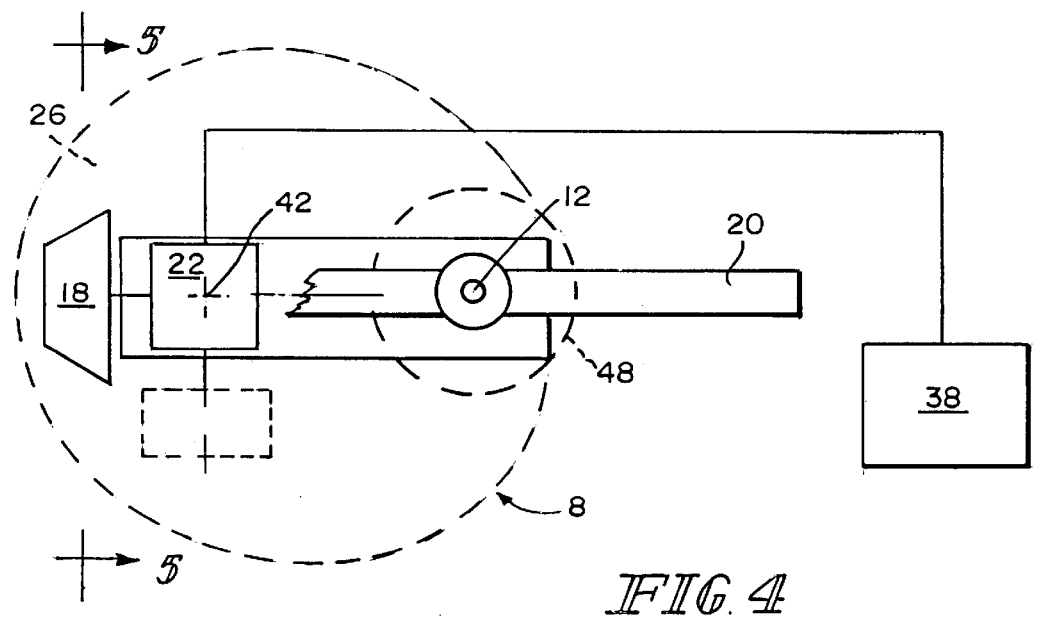
FIG. 4 is a top diagrammatic view of the gauge of FIG. 1, showing the rake sensor rotated to the uppermost (visible from the top) position such that the pitch sensor is positioned (not visible) below the rake sensor and ready to measure the pitch of the propeller blade (shown in phantom)
Figure 5:
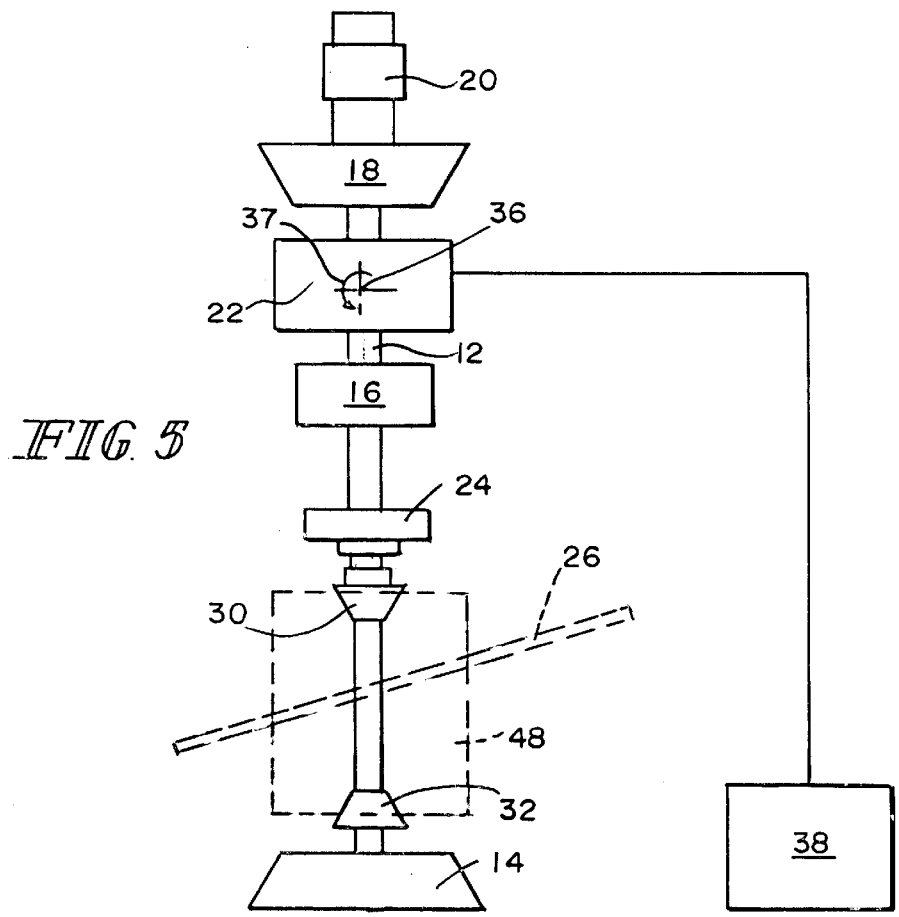
FIG. 5 is a side diagrammatic view of the gauge of FIG. 4 taken along the lines 5—5, showing the rake sensor in its uppermost unused position, the pitch sensor in the lowered position and ready for zeroing on the calibrating platen and the eventual measuring of the pitch of the propeller blade (shown in phantom)
Figure 6:
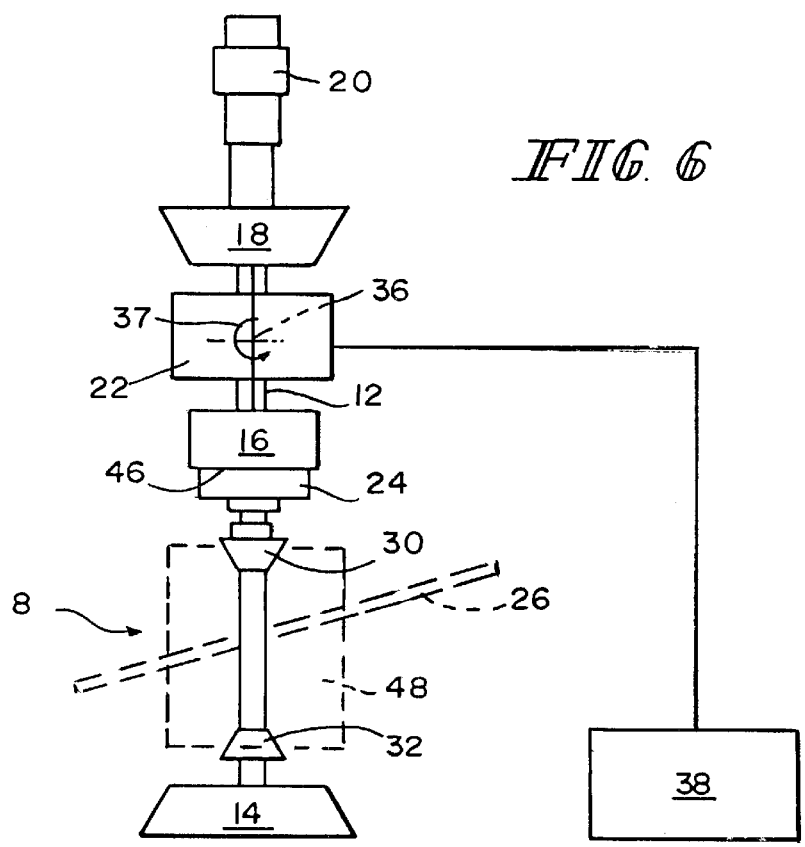
FIG. 6 is a side diagrammatic view of the gauge similar to that of FIG. 5, showing the pitch sensor being zeroed while contacting the calibrating platen.
Figure 7:
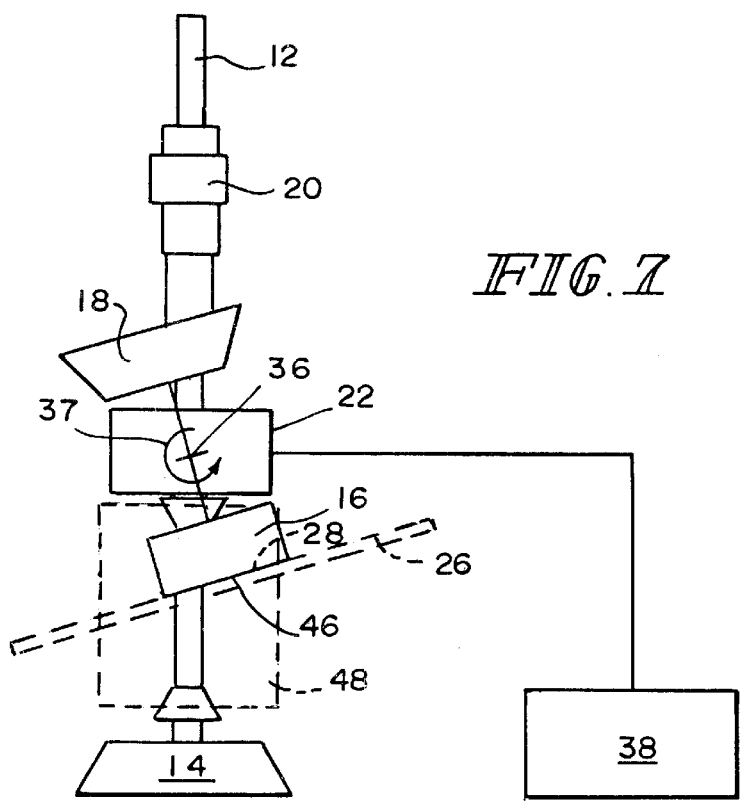
FIG. 7 is another side diagrammatic view of the gauge similar to that of FIG. 6, showing the pitch sensor in a rotated position as it is placed in contact with the propeller blade (shown in phantom), wherein the rotational sensor senses the rotation of the pitch sensor relative to the zeroed position of FIG. 6 and transmits signals representative of the rotation to the output device.
Figure 8:
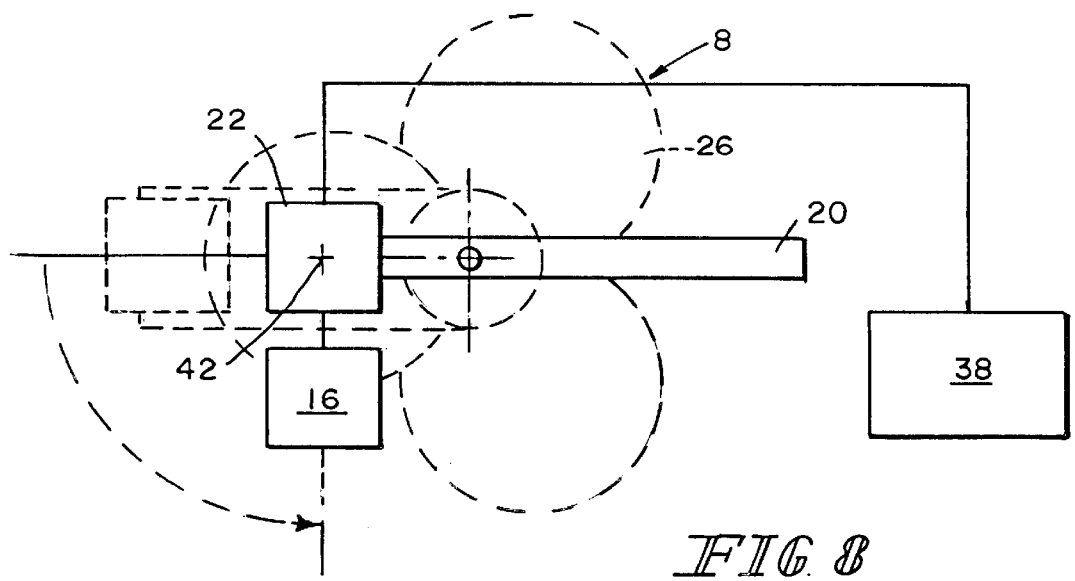
FIG. 8 is a top diagrammatic view of the gauge similar to that of FIG. 4, showing the pitch sensor after it has been rotated about an axis parallel to the propeller mount axis and after the pitch sensor and rake sensor have been further rotated about an axis passing through the rotational sensor such that the pitch sensor is in its uppermost (visible from the top) unused position and the rake sensor (not visible) is ready to measure the rake of the propeller blade below (shown in phantom)
Figure 9:
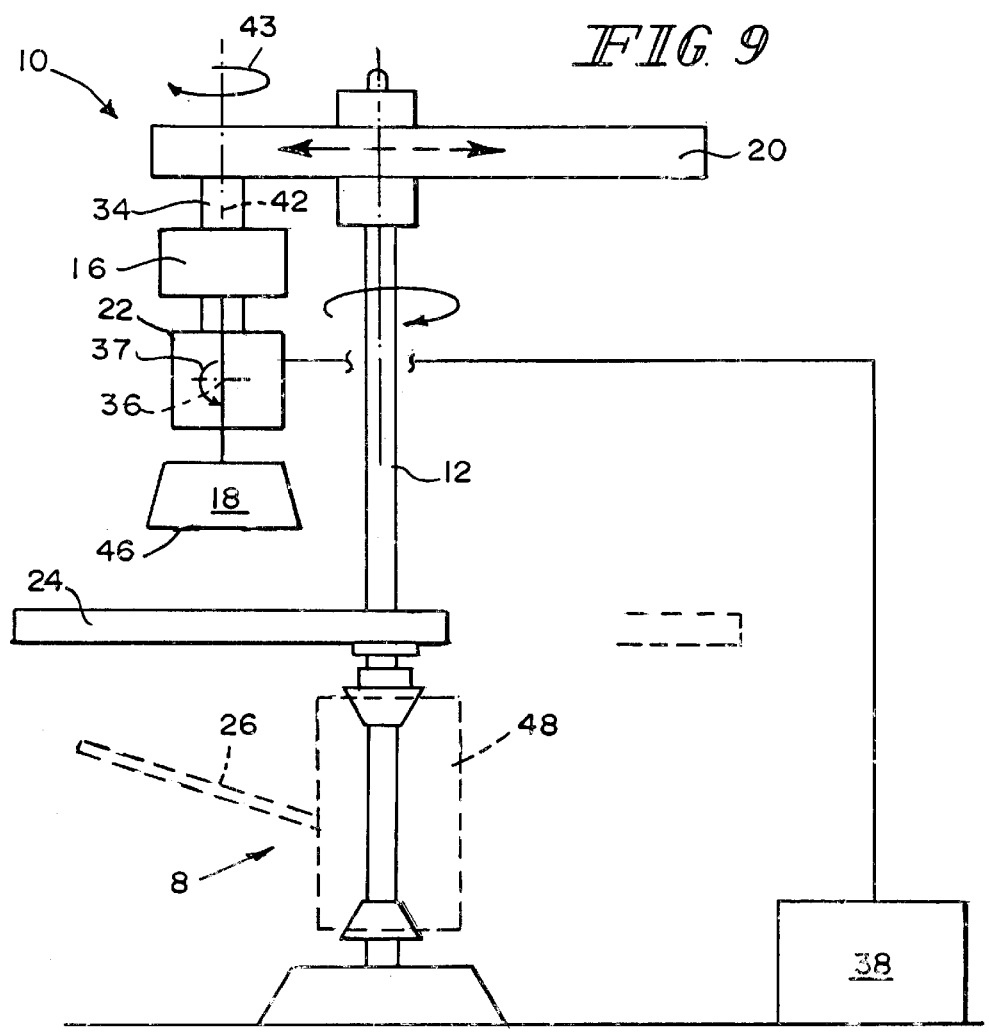
FIG. 9 is front diagrammatic view of the gauge shown in FIG. 8, illustrating the rake gauge in the lowered position and ready for zeroing on the calibrating platen for eventual measurement of the rake of the propeller blade (shown in phantom)

One method of using the pitch sensor 16 is diagrammatically shown in FIGS. 4–7. After the propeller 8 is positioned on the propeller mount, measurer 44 is shown in FIGS. 4 and 5 to be connected to the propeller mount and positioned such that rake sensor 18 is above the rotational sensor 22, and pitch sensor 16 is below the rotational sensor 22. Gauge 10 is then assigned a neutral value, or "zeroed" prior to testing for the pitch of a propeller blade 26 by moving measurer 44 so that pitch sensor 16 rests on calibrating platen 24, as shown from the side in FIG. 6. Once pitch sensor 16 has been positioned on calibrating platen 24, output device 38 is "zeroed" such that the rotation of pitch sensor 16 relative to rotational sensor 22 is set to a value of zero. Thereafter, as shown in FIG. 7, calibrating platen 24 can be moved and pitch sensor 16 lowered such that surface 40 of pitch sensor 16 engages surface 28 of propeller blade 26.

The engagement of pitch sensor 16 with propeller blade 26 causes measurer 44 to rotate about axis 36, thereby providing movement of measurer 44 relative to rotational sensor 22. This relative movement is sensed by rotational sensor 22, and in turn communicated via signals to output device 38. According to the disclosure, signals are illustratively electronic signals.

Gauge 10 is also configured to measure the rake of a propeller blade 26, as shown in FIGS. 8–11. As diagrammatically shown in FIGS. 8 and 9, measurer 44 is arranged such that pitch sensor 16 is positioned above rotational sensor 22 and rake sensor 18 is positioned below rotational sensor 22 and ready for measurement of the rake of the propeller blade 26. Furthermore, support member 34 is rotated about axis 42 so that rake sensor 18 can measure the rake of propeller blade 26 along a substantially radial line while rotating about axis 36.

Figure 10:
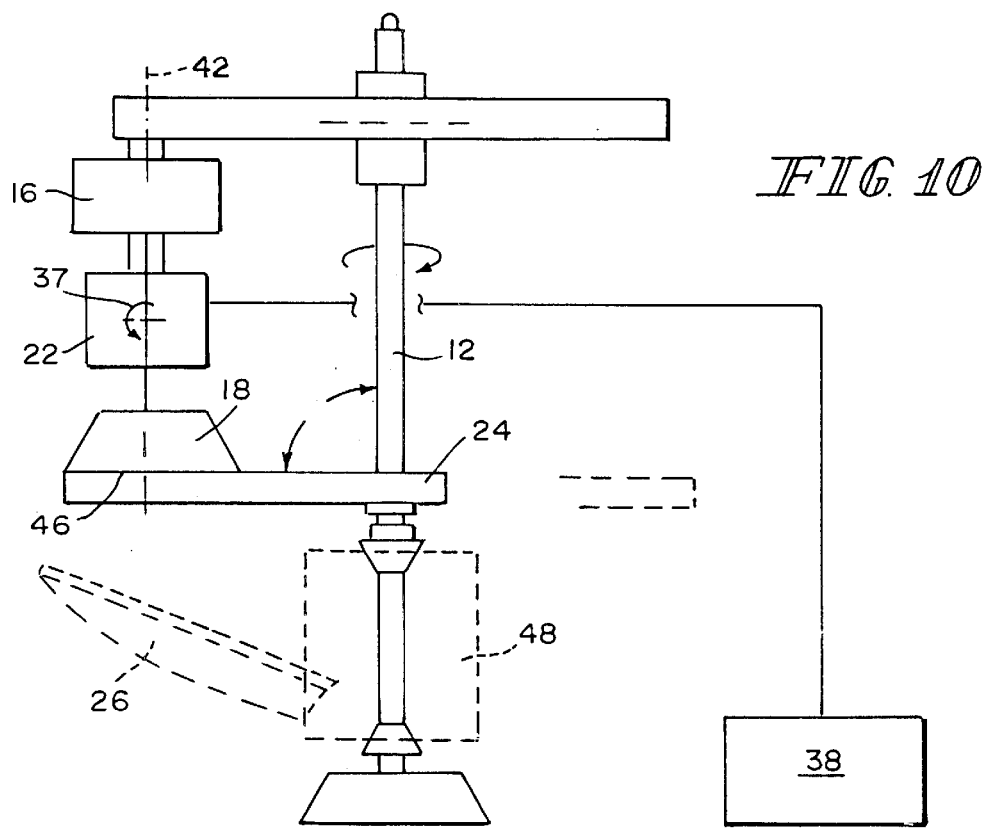
FIG. 10 is a front diagrammatic view similar to that shown in FIG. 9, illustrating the rake sensor being zeroed while it is in contact with the calibrating platen.
Figure 11:
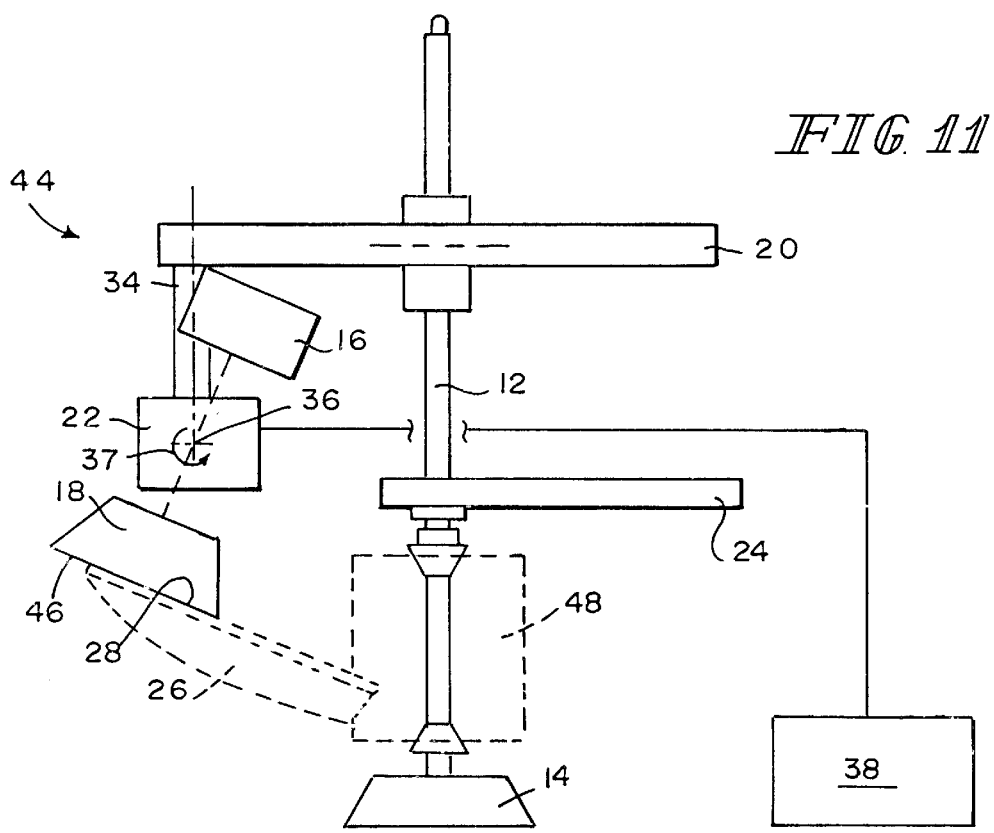
FIG. 11 is a front diagrammatic view similar to that shown in FIG. 10, illustrating the rake sensor in a rotated position as it is placed in contact with the propeller blade (shown in phantom), wherein the rotational sensor senses the rotation of the rake sensor relative to the zeroed position of FIG. 10 and transmits signals representative of the rotation to the output device.

Rake sensor 18 is prepared for use by lowering rake sensor 18 so that it rests upon calibrating platen 24, as shown in FIG. 10. Once rake sensor 18 has been positioned on calibrating platen 24, output device 38 is zeroed such that the position of rake sensor 18 relative to rotational sensor 22 is set to a value of zero. Thereafter, as shown in FIG. 10, calibrating platen 24 can be moved and rake sensor 18 lowered such that surface 46 of rake sensor 18 engages surface 28 of propeller blade 26.

Similar to the operation of the pitch sensor above, the engagement of rake sensor 18 with propeller blade 26 causes measurer 44 to rotate about axis 36, thereby providing movement of measurer 44 relative to rotational sensor 22. This relative movement is sensed by rotational sensor 22, and in turn signaled to output device 38 for indication of the rake.

Figure 12:
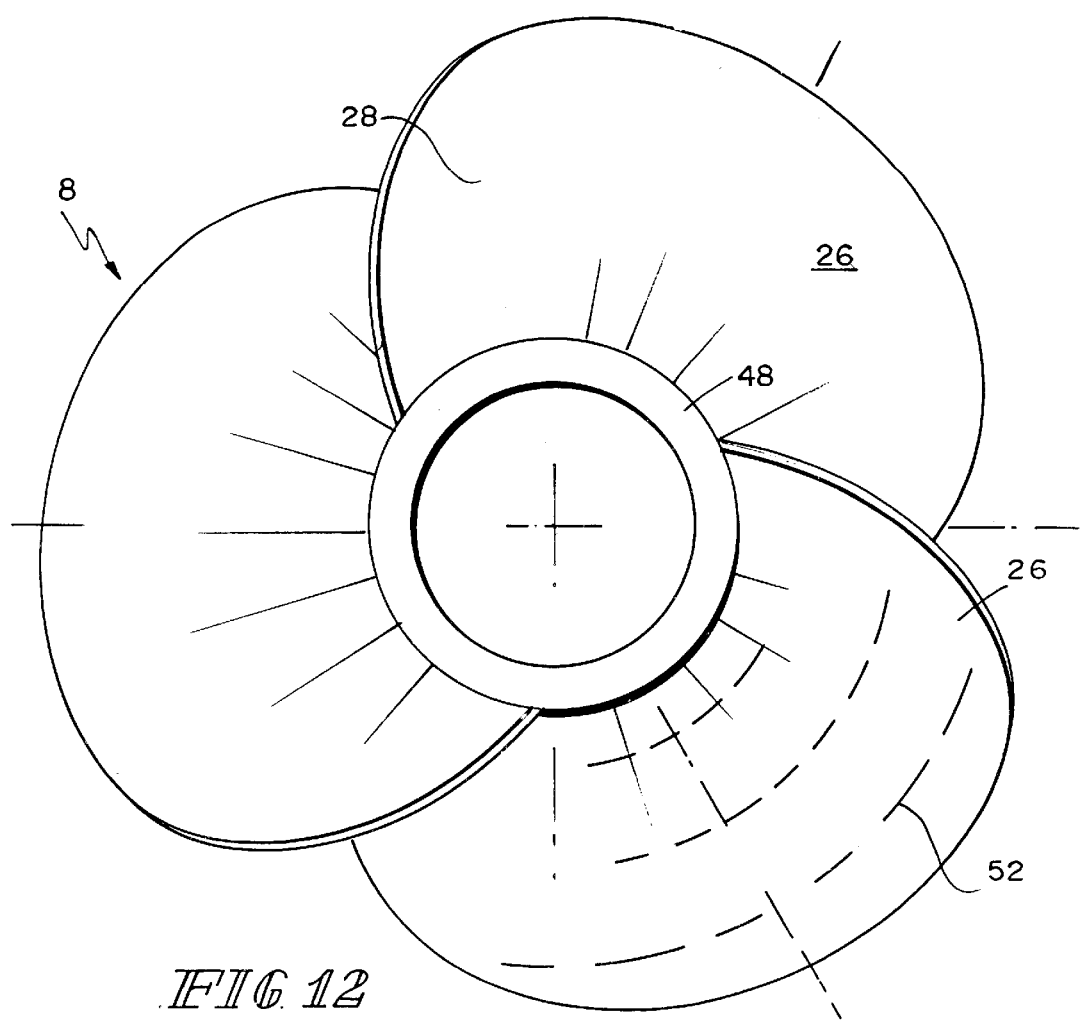
FIG. 12 is a top view of a propeller showing radially distanced circumferential lines representative of the lines on which pitch could be measured, and showing a radially extending line representative of a line on which rake could be measured.
Figure 13:
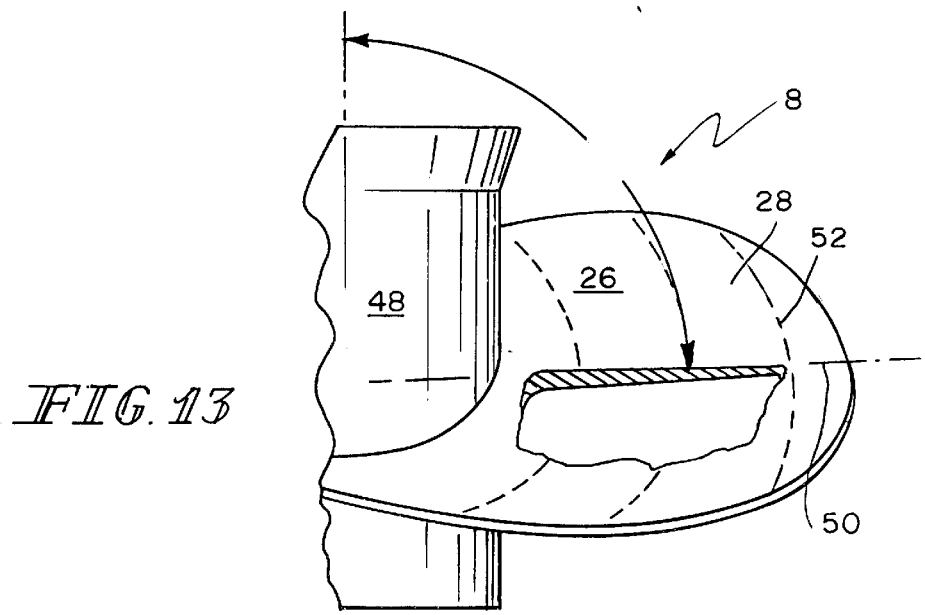
FIG. 13 is a side view of the propeller of FIG. 12, showing the radially distanced lines for measuring pitch and the radially extending line on which rake could be measured.

A typical propeller 8 is shown in FIGS. 12 and 13. Rake of the propeller blade 26 is measured along a radial line, such as rake measurement line 50. The pitch of a propeller blade 26 can be measured from any two points substantially equidistant from post 12, such as two points along pitch measurement line 52.

FIGS. 14–23 show an embodiment of gauge 110 wherein radial position arm 120 is shown with detents 121, 123, 125, 127, 129, and 131 for radially positioning arm 120 with the cooperation of lock 135 in an appropriate position for the measurement of either the pitch or the rake of the propeller. A second lock 133 cooperates with detents (not shown) on the underside of detent block 137 to provide two locked positions for support member 134, support member 134 being configured for rotation about axis 142. Gauge 110 includes a post 112, a base 114, and centering cones 130, 132 for supporting a propeller 8 with blades 26. Lock 141 fixes centering cones 130, 132 and propeller 8 in a vertically locked position.

Figure 14:
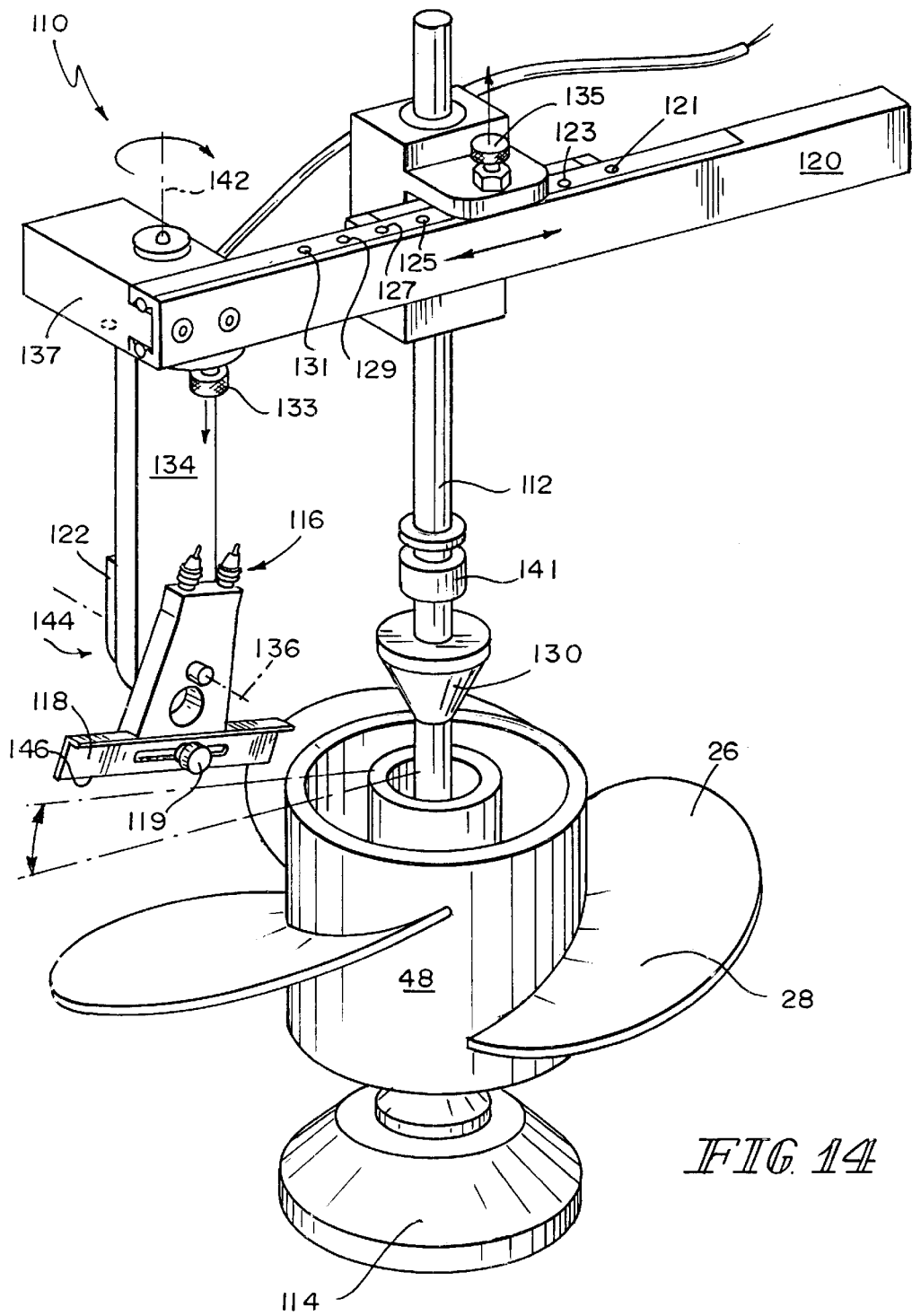
FIG. 14 is a perspective view of one embodiment of the gauge, showing the rake sensor supported above the propeller blade, and showing the pitch sensor in the unused position, rotated away from the propeller blade, both the rake sensor and the pitch sensor capable of being rotated about an axis through the support member, the axis being communicatively coupled to the rotational sensor, which is specifically an optical encoder.
Figure 15:
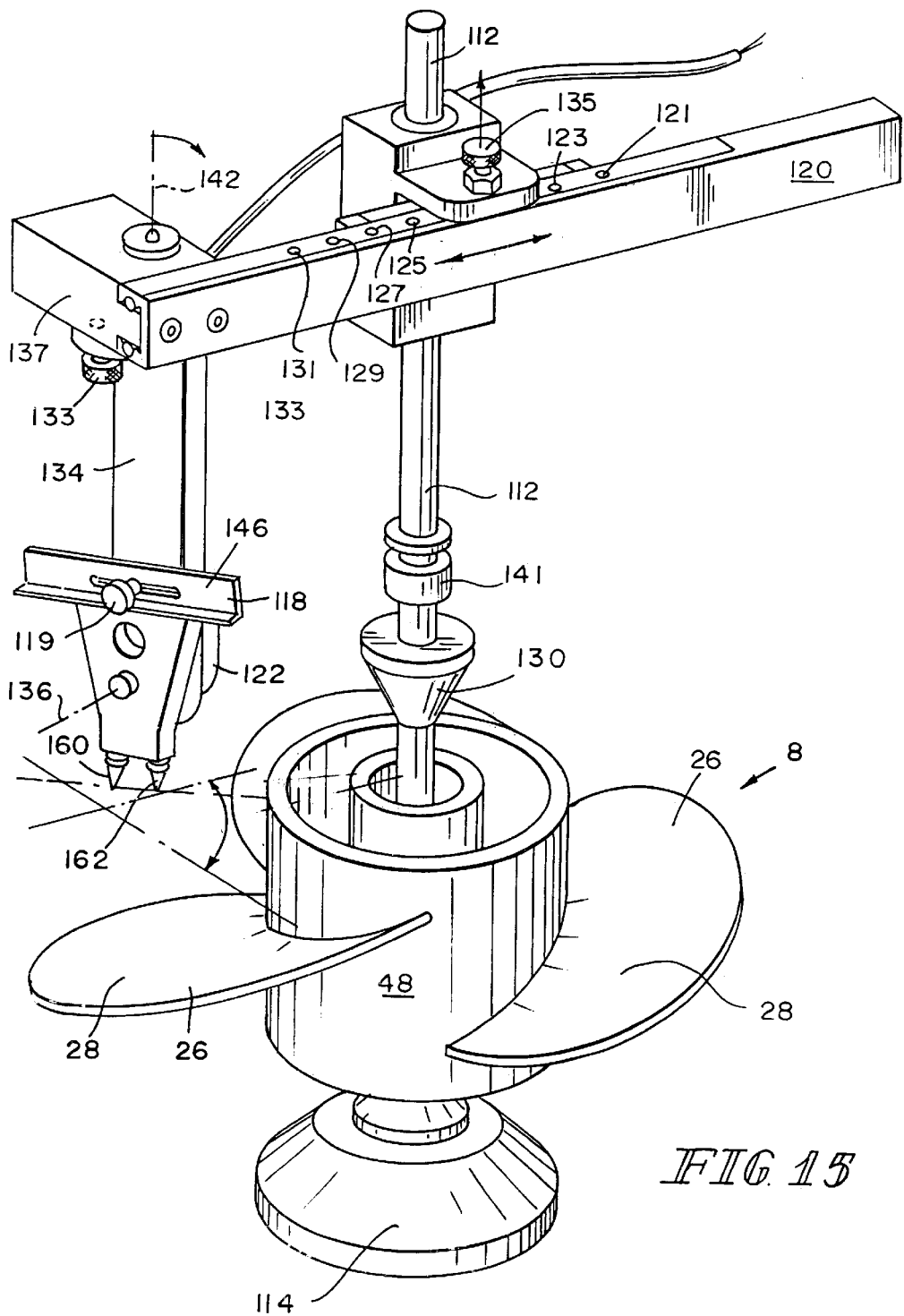
FIG. 15 is a perspective view of the gauge of FIG. 14, showing the pitch sensor supported above the propeller blade and ready to measure the pitch of the blade relative to a "zero line" and also showing the rake sensor rotated to the unused position away from the propeller blade.
Figure 16:
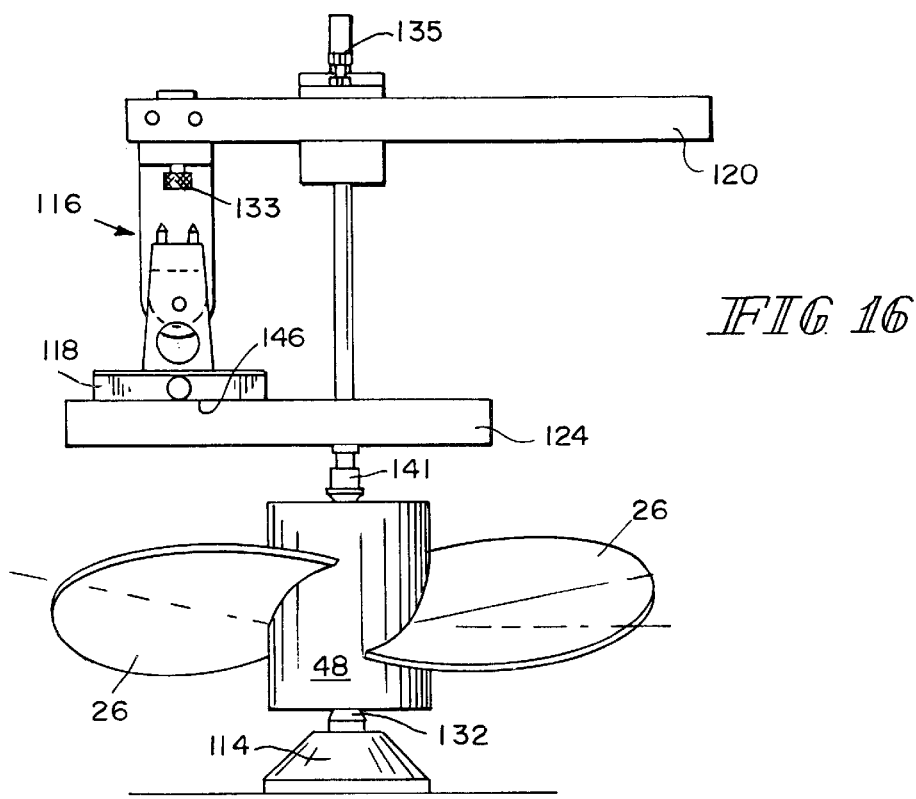
FIG. 16 is a front elevation view of the gauge of FIG. 14, showing the rake sensor being zeroed on the calibrating platen prior to lowering for contact with the propeller blade.
Figures 17, 18:
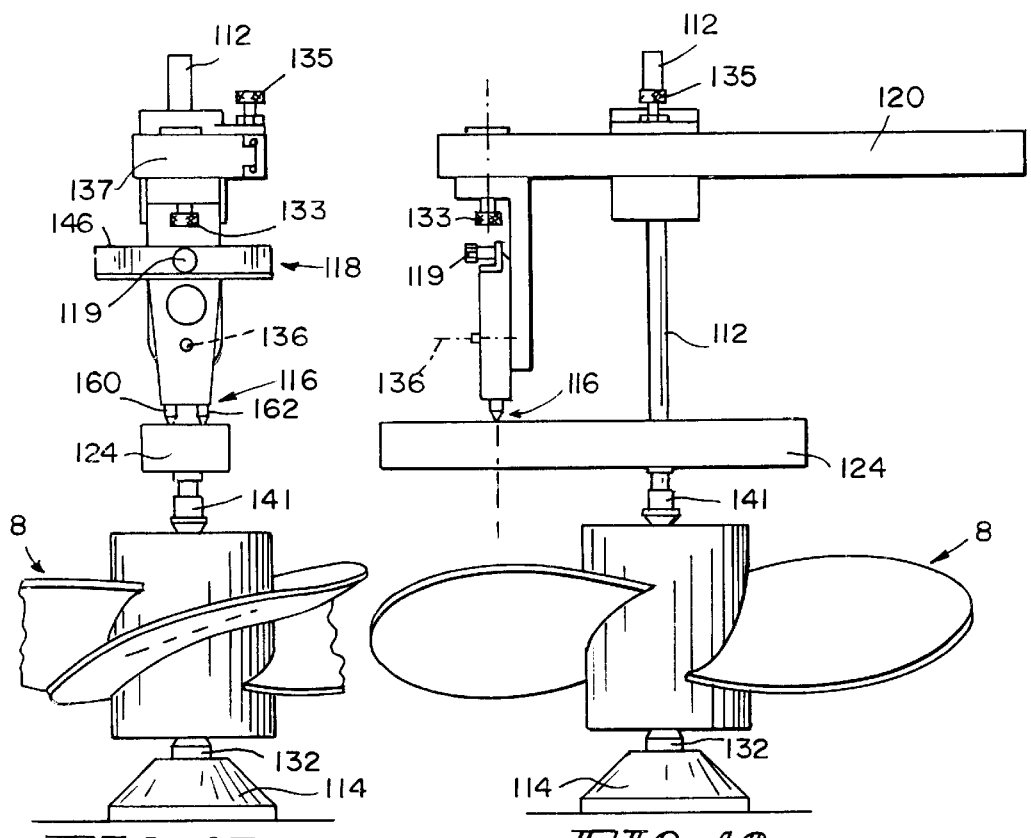
FIG. 17 is a side elevation view of the gauge of FIG. 15, showing the pitch sensor being zeroed on the calibrating platen prior to lowering for contact with the propeller blade.
FIG. 18 is a front elevation view of the gauge of FIG. 17, showing the pitch sensor being zeroed on the calibrating platen.
Figure 19:
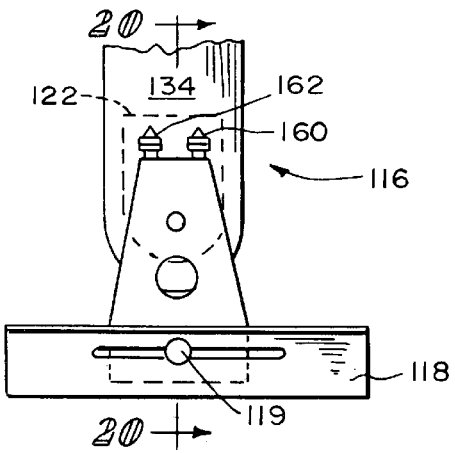
FIG. 19 is a front view of the lower portion of the support member, showing the rake sensor in the lowered position and the pitch sensor in the uppermost unused position, both being rotatably coupled to the optical encoder (shown in phantom) via a centralized axis.
Figure 20:
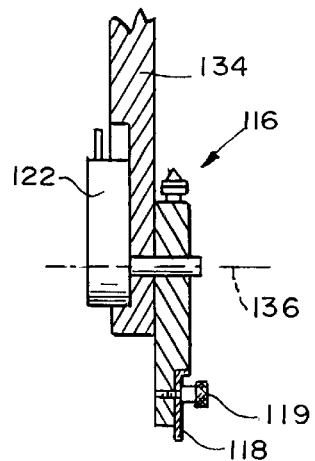
FIG. 20 is a sectional view taken along the line 20—20 of FIG. 19, showing the rake sensor and pitch sensor to be rotatably coupled via an axis to the optical encoder, the optical encoder being positioned on an opposite face of the support member as the pitch and rake sensors.
Figure 21:
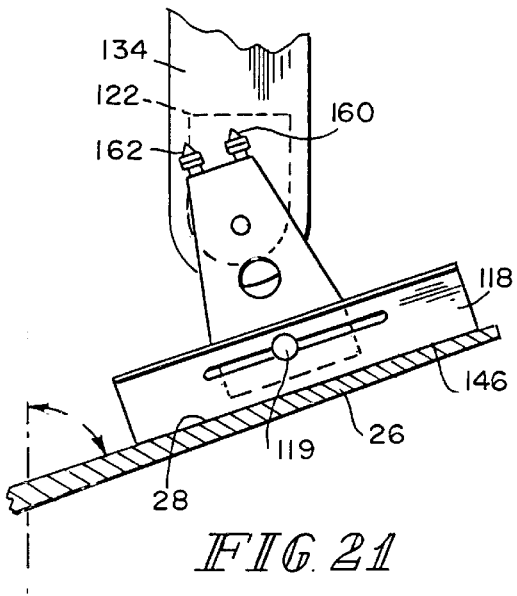
FIG. 21 is a side view of the rake sensor in contact with a propeller blade, the rake sensor pivoted at an angle relative to the zeroed position of FIG. 16.
Figure 22:
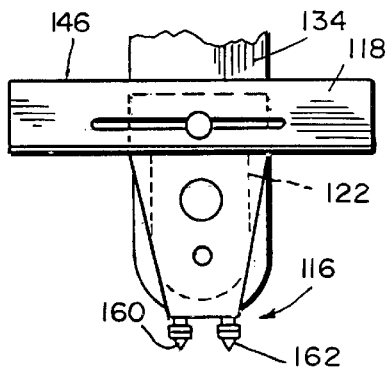
FIG. 22 is a side view of the gauge showing the pitch sensor rotated into the lowered position and ready to measure the pitch of a propeller blade.
Figure 23:
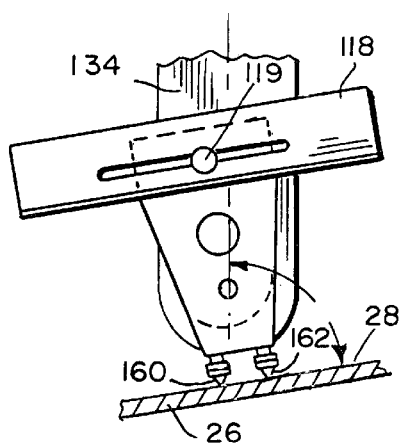
FIG. 23 is a side view of the gauge of FIG. 22, showing the pitch sensor in contact with a propeller blade, the pitch sensor pivoted at an angle relative to the zeroed position shown in FIGS. 17 and 18.

As shown in FIGS. 14, 16 and 21, measurer 144 can be rotated about axis 136 to a rake-sensing mode where rake sensor 118 is positioned for engagement of contact surface 146 with surface 28 of propeller blade 26. Axis 136 passes through optical encoder 122 for measurement of the relative rotation of both rake sensor 118 and pitch sensor 116, similar to the function of rotational sensor 22, discussed above. Illustratively, optical encoder 122 is a Model 1024 encoder of the S1 class, manufactured by US Digital Corp. While the illustrated embodiment uses a 1024 count encoder (i.e. 1024 pulses are signaled per 90 degrees of rotation) for measuring, it should be understood that encoders of various types are within the scope of the disclosure.

Calibrating platen 124 is provided for zeroing of both sensors 118, 116. Rake sensor 118 includes a releasable lock 119 for selective sliding movement of the rake sensor 118 relative to the measurer 144.

Additionally, as shown in FIGS. 15, 17, 18, 22, and 23, measurer 144 can be further rotated about axis 136 to a pitch-measuring mode where pitch sensor 116 is positioned to engage surface 28 of propeller blade 26. It will be appreciated that while pitch sensor 116 is shown to have a first foot 160 and a second foot 162 for engagement with surface 28 of propeller blade 26, other configurations permitting engagement of pitch sensor 116 with surface 28 are within the scope of this disclosure. The feet 160, 162 or pointed engagers engage the curved surface 28 at two spaced apart points which establish an imaginary line therebetween. The angle of this line, as reflected by the encoder 122, represents the pitch of the blade surface.

Display or output device 38 receives signals from optical encoder 122 and is configured to calculate either the pitch or the rake of the propeller blade surface 28 at a given moment. When it is determined whether pitch or rake will be measured, the corresponding pitch sensor 116 or rake sensor 118 is first positioned on the calibrating platen 124 and output device 38 is zeroed so that such a position is assigned a zero value by the output device 38. The calibrating platen 124 is then moved out of the way and sensor 116 or 118 is rotated into position for contact with the propeller blade 26. When sensor 116 or 118 is in contact with propeller blade 26, optical encoder 122 sends signals representing the rotated position of the sensor 116, 118 about axis 136 of optical encoder 122 to the output device 38. Output device 38 is prompted by a user to report either the pitch or the rake.

Illustratively, output device 38 receives signals from optical encoder 122 representing the relative rotation of sensors 116, 118 in degrees. If output device 38 is configured to produce a rake measurement, output device 38 simply displays the degree signal received from the optical encoder. If output device 38 is configured to provide a pitch measurement, the following formula is used:

Pitch=Radius×2×*pi*×tan (degree input from optical encoder)

The output device receives input from a user as to the particular radius at which pitch measurement is taken. The various radius positions are standardized and known in the art, and can be selected using detents 121, 123, 125, 127, 129, and 131 of radial position arm 120 in cooperation with lock 135.

While the disclosure is susceptible to various modifications and alternative forms, specific exemplary embodiments thereof have been shown by way of example in the drawings and has herein be described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

There are a plurality of advantages of the present invention arising from the various features of the pitch and rake gauge and associated method described herein. It will be noted that alternative embodiments of the gauge and associated method of the present invention may not include all of the features described yet still benefit from at least some of the advantages of such features. Those of ordinary skill in the art may readily devise their own implementations of a pitch and rake gauge and associated method that incorporate one or more of the features of the present invention and fall within the spirit and scope of the present invention as defined by the appended claims.

What is claimed is:

1. A gauge for measuring a pitch and a rake of a blade on a propeller, the gauge comprising
    a propeller mount configured to engage a propeller,
    a measurer coupled to the propeller mount and adapted to engage the blade in a stationary position, the measurer movable between a pitch measuring position and a rake measuring position,
    a rotational sensor sensing rotational movement of the measurer and providing signals representative of the rotational movement of the measures, and
    a display adapted to receive the signals and provide an output of the pitch and the rake based on the signals.

2. The gauge of claim 1, wherein the rotational sensor is coupled to the propeller mount and adapted to move between a pitch-sensing mode and a rake-sensing mode.

3. The gauge of claim 1, wherein the rotational sensor is an optical encoder.

4. The gauge of claim 1, further comprising a calibrating platen adapted to provide a reference from which to gauge rotational movement.

5. An apparatus for measuring a rake of a propeller blade, the apparatus comprising
    a propeller mount configured to engage a propeller, the propeller mount having an axis,
    an arm configured to couple to the propeller mount and extend radially therefrom,
    a support member attached to the arm,
    a rake sensor configured to engage the propeller blade, the rake sensor being rotatably coupled to the support member,
    a rotational sensor coupled to the rake sensor, the rotational sensor configured to determine the rotation of the rake sensor relative to the support member and provide signals representative of the determined rotation, and
    a display configured to receive the signals and provide an output of the rake based on the signals.

6. The apparatus of claim 5, wherein the rake sensor is a straight-edge configured to extend along a radial line relative to the blade of the propeller.

7. The apparatus of claim 5, wherein the rotational sensor is an optical encoder.

8. The apparatus of claim 5, further comprising a pitch sensor coupled to the rake sensor.

9. The apparatus of claim 8, wherein the rotational sensor further determines the rotation of the pitch sensor relative to the support member and provides signals representative thereof.

10. The apparatus of claim 8, wherein the support member is configured to be moved between a pitch-measuring mode and a rake-measuring mode.

11. A method of measuring a characteristic of a blade on a propeller, the propeller having an axis, the method comprising the steps of:
    positioning the propeller on a propeller mount,
    connecting a measurer to the propeller mount,
    assigning a neutral position for the measurer from which rotational measurements will be based,
    moving the measurer into contact with a selected position on the propeller blade and rotating the measurer as necessary,
    determining the rotation of the measurer relative to the neutral position,
    providing an electronic indication of the rotation of the measurer relative to the neutral position.

12. The method of claim 11, neutral-position-assigning step includes moving the measurer into contact with a calibrating platen and zeroing the measurer while in that position.

13. The method of claim 11, wherein the measurer comprises two feet in spaced apart relation, the two feet being configured to contact the propeller blade at two points substantially equally distant from the axis of the propeller.

14. The method of claim 13, wherein the electronic indication provided is an indication of the pitch of the blade.

15. The method of claim 11, wherein the measurer comprises a straight-edge configured to extend along a radial line relative to the propeller blade.

16. The method of claim 15, wherein the electronic indication provided is an indication of the rake of the blade.

17. An apparatus for measuring a pitch of a propeller blade, the apparatus comprising
    a propeller mount configured to support a propeller, the propeller mount having an axis,
    an arm configured to couple to the propeller mount and extend radially therefrom,
    a support member attached to the arm,
    a pitch sensor configured to engage the propeller blade, the pitch sensor being rotatably coupled to the support member,
    a rotational sensor coupled to the support member, the rotational sensor configured to determine the rotation of the pitch sensor relative to the support member and provide signals representative of the determined rotation, and
    a display configured to receive the signals and provide an output of the pitch based on the signals.

18. The apparatus of claim 17, wherein the pitch sensor comprises two feet in spaced apart relation, the two feet being configured to contact the propeller blade at two points substantially equally distant from the axis of the propeller mount.

19. The apparatus of claim 17, wherein the rotational sensor is an optical encoder.

20. A gauge for measuring the pitch and the rake of a blade on a propeller, the gauge comprising
    a propeller mount configured to engage the propeller, the propeller mount having an axis,
    an arm configured to couple to the propeller mount and extend radially therefrom,
    a support member rotatably attached to the arm for rotation about an axis between a pitch-sensing position and a rake-sensing position, the support member extending from the arm such that its axis is substantially parallel to the propeller mount axis, the support member further having a first end coupled to the arm and a second end opposite the first end, a pivot member rotatably coupled to the second end of the support member, the pivot member having two ends and a pivot axis extending substantially perpendicularly through the support member, a pitch sensor coupled to one end of the pivot member and configured to engage the propeller blade, a rake sensor coupled to the other end of the pivot member and configured to engage the propeller blade, a rotational sensor coupled to the pivot member, the rotational sensor configured to determine the rotation of the pivot member relative to the support member and provide signals representative of the determined rotation, and a display configured to receive the signals and provide an output based on the signals, wherein the pivot member can be pivoted about its axis between a position wherein the rake sensor is presented to the propeller blade and a position wherein the pitch sensor is presented to the propeller blade.

* * * * *